United States Patent [19]

Gawron et al.

[11] 3,903,476

[45] Sept. 2, 1975

[54] TRIGGERING MEANS FOR SILICON CONTROLLED RECTIFIER CIRCUIT

[75] Inventors: Alex F. Gawron, Chicago; Louis J. Vassos, Park Ridge, both of Ill.

[73] Assignee: Skil Corporation, Chicago, Ill.

[22] Filed: July 15, 1974

[21] Appl. No.: 488,671

Related U.S. Application Data

[63] Continuation of Ser. No. 341,905, March 16, 1973, abandoned.

[52] U.S. Cl........... 323/22 SC; 307/246; 307/252 N; 323/36; 323/39; 338/125

[51] Int. Cl.²................... H02P 13/16; H02M 5/257

[58] Field of Search.................... 323/22 SC, 36, 39; 338/125, 126, 176; 307/239, 246, 252 R, 252 N

[56] References Cited

UNITED STATES PATENTS

| | | | |
|---|---|---|---|
| 3,194,973 | 7/1965 | Belt et al. | 323/36 |
| 3,218,511 | 11/1965 | Rosenbaum | 323/36 |
| 3,300,711 | 1/1967 | Duncan | 323/22 SC |
| 3,328,676 | 6/1967 | Slater | 323/22 SC |
| 3,392,626 | 7/1968 | Miller et al. | 323/22 SC |
| 3,456,228 | 7/1969 | Wright | 338/176 |
| 3,543,141 | 11/1970 | Lawson | 323/36 X |
| 3,551,639 | 12/1970 | Gotley | 323/36 |

OTHER PUBLICATIONS

RCA Silicon Power Ckts Manual (Tech Series SP–50) 1967, pp. 54,55,214–218. Upon.

*Primary Examiner*—Gerald Goldberg
*Attorney, Agent, or Firm*—McDougall, Hersh & Scott

[57] ABSTRACT

The circuit for controlling the power supplied to a load from an alternating source in which a silicon control rectifier is connected in series with the source and the load. The particular silicon control rectifier used is one in which the impedance between the cathode and the gate is sufficiently high so that a simple RC firing circuit can be connected to the gate and the capacitor charged periodically to a value sufficient to effect conduction of the SCR.

4 Claims, 10 Drawing Figures

TRIGGERING MEANS FOR SILICON CONTROLLED RECTIFIER CIRCUIT

BACKGROUND OF THE INVENTION

This is a continuation of application Ser. No. 341,905, filed Mar. 16, 1973, now abandoned.

This invention relates generally to power control circuits. More specifically, it relates to improvements in such circuits utilizing SCRs to control power supplied to a load from an AC source.

Heretofore, when silicon control rectifiers have been used to control power supplied to a load, it has generally been found necessary to provide a so-called triggering device connected between a firing or phase shift circuit for controlling the time of application of a firing signal to the gate of the SCR. The triggering devices used have included unijunction transistors, triggering diodes and the like. One of the advantages in the use of triggering devices is that with such devices the control circuit can be operated at low power for energy may be stored, usually in a capacitor, and then releasing the stored energy to fire the SCR.

It has been found, however, that when an SCR is used there is a substantial impedance between the gate and the cathode. However, for various reasons it is not uncommon to provide an internal shunt so as to substantially reduce this impedance. There are in existence a number of SCRs which are not provided with an internal gate to cathode shunt. Three such SCRs are the C107B sold by the General Electric Company, the RCA-107 sold by the Radio Corporation of America and the MCR407-4 sold by Motorola. It has been found that this characteristic of such an SCR can be utilized to advantage to provide firing circuits that are relatively economical, reliable and accurate.

It is therefore an object of this invention to provide a novel power control circuit which utilizes a relatively small number of parts while at the same time is capable of providing a relatively precise control of power supplied to a load.

It is another object of this invention to provide a novel circuit which provides relatively precise control of the power supplied to a load and which uses relatively economical components.

BRIEF SUMMARY OF THE INVENTION

The foregoing and other objects are achieved by providing a power control circuit in which an SCR having a relatively high impedance between the cathode and the gate is connected in series with a load to be supplied and a source of AC power. A firing circuit including a resistor and a capacitor in series with each other is connected across the SCR and the junction between these two elements is connected to the gate electrode so that when the capacitor is charged to a sufficiently positive value gate, current will be supplied to the SCR of a magnitude sufficient to cause it to conduct. The resistor is adjustable in order to vary the charging rate of the capacitor.

BRIEF DESCRIPTION OF THE DRAWINGS

The construction and mode of operation of various types of embodiments of the invention can be best understood by reference to the detailed description taken in conjunction with the drawing in which.

DETAILED DESCRIPTION

Figures 1, 2A, 2B, 2C, 3, 4, 5:
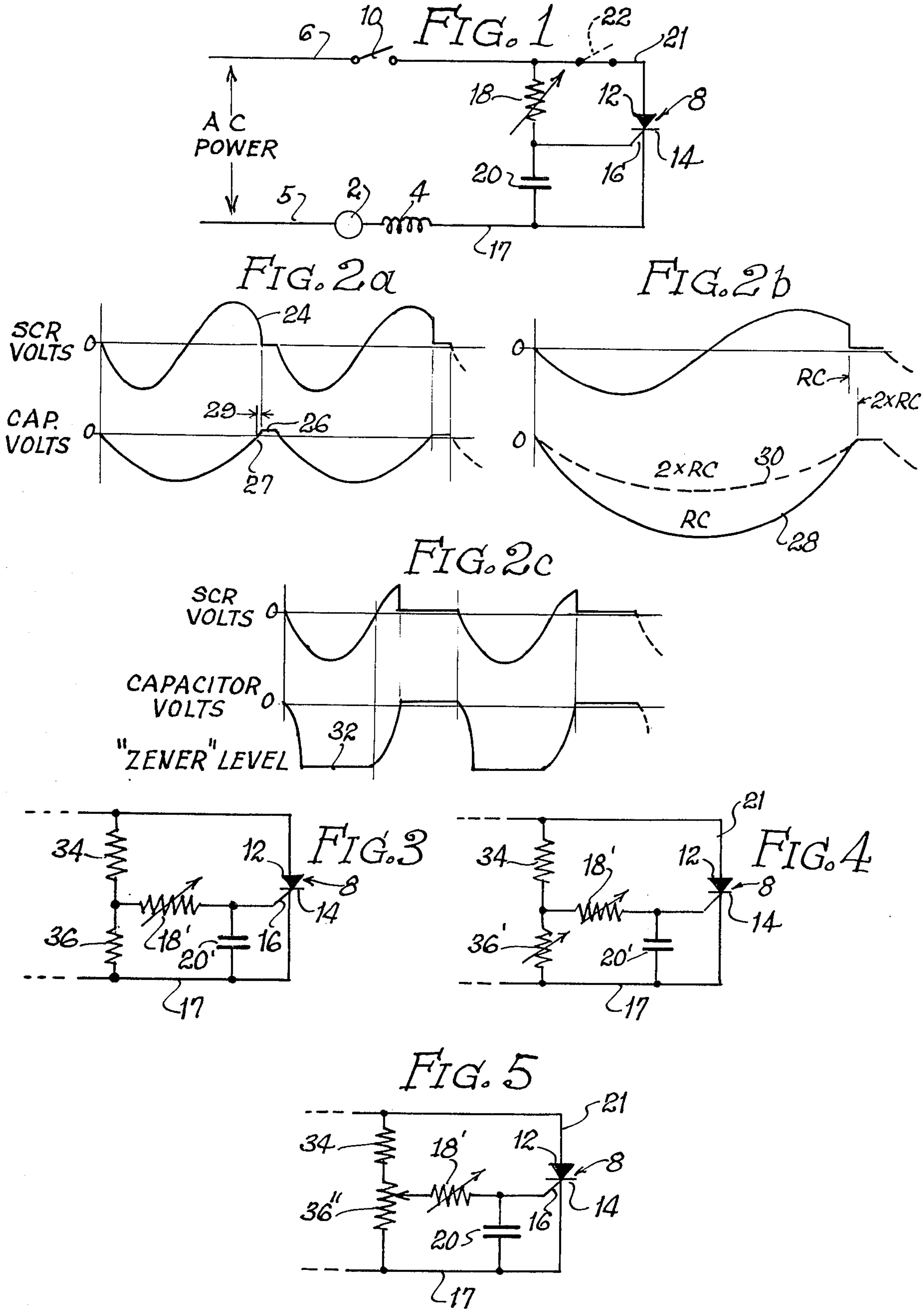
FIG. 1 is a schematic illustration of a first embodiment of the invention.
FIG. 2*a* is an illustration of the voltage waveforms which appear across the capacitor and the SCR during operation of the circuit.
FIG. 2*b* is an illustration of the voltage waveforms which appear across the capacitor and the SCR at low conduction angles to illustrate the effect of changing the RC time constant by a factor of 2.
FIG. 2*c* is an illustration of the voltage waveforms which may appear across the capacitor and the SCR at high conduction angles.
FIG. 3 is a schematic illustration of a second embodiment of the invention.
FIG. 4 is a schematic illustration of a third embodiment of the invention.
FIG. 5 is a schematic illustration of a fourth embodiment of the invention.

FIG. 1 illustrates a circuit in accordance with the invention for supplying a load such as a series motor having an armature 2 and a field winding 4 connectable to one side of an AC power source through a conductor 5. A conductor 6 is connectable to one side of an AC power source. Connected to the conductor 6, in series with an SCR 8, is a control switch 10 which is opened until it is desired to energize the load. The SCR includes the usual anode 12, cathode 14 and gate 16. A conductor 17 connects the cathode 14 to the winding 4. A control or firing circuit is constituted by an adjustable resistor 18 connected in series with a capacitor 20 across the SCR. As may be seen in the drawing: the junction of the resistor and capacitor is connected directly to the gate 16; the cathode 14 is connected to one side of the capacitor 20 and the winding 4; and the anode 12 is connected to a terminal of the switch 10 via conductor 21.

While the illustrated embodiment shows a particular series arrangement of the load switch and power, others may be selected by a designer. For instance, the load could be connected between the anode and switch 10.

It is to be particularly noted that the SCR is selected to be one in which there is a relatively high resistance between the gate and the cathode. This is done in order to permit the capacitor 20 to be charged in the negative direction. Were there a low gate to cathode resistance present the negative charge would be lost to some degree in that resistance thereby decreasing the firing delay. In addition it becomes possible to take advantage of "zener" characteristics of the cathode-gate junction. That is to say, in those SCRs where there is no intentional internal short provided between the cathode and gate, the cathode will "hold-off" a negative voltage applied thereto until a zener value is reached at which time it will conduct and the voltage will be held at that zener value. Suitable SCRs include those designated above.

If desired, the operating switch 10 can be located as shown in dotted lines by reference numeral 22 for a purpose to be hereinafter described. The same option exists with respect to the embodiments illustrated in FIGS. 3, 4 and 5.

The operation of the circuit can be understood by reference to FIGS. 2*a*–2*c*. In these figures, the upper curve illustrates the waveform of the voltage on the anode 12 while the lower curve illustrates the waveform of the voltage on the capacitor 20. If it is assumed that the switch 10 is closed and the SCR has conducted during the positive half of a cycle of the A C supply on the conductor 6, the capacitor will have a slight positive charge equal to the forward gate to cathode voltage of the SCR. During a negative half cycle on the conductor 6, the capacitor is charged negatively. During the following positive half cycle on that conductor, the negative charge on the capacitor is reduced to zero and the capacitor then is charged positively until a value is reached where in causes sufficient current to flow into the gate to cause the SCR to turn on or conduct. This is illustrated by the point 24 on the upper curve of FIG. 2*a*. The portion 26 on the lower curve of that figure illustrates the value of the slight positive charge remaining on the capacitor due to the forward gate to cathode voltage of the SCR. As may be seen, the charge on the capacitor remains at this slight positive charge until the beginning of the next negative half cycle. By adjusting the resistance value of the resistor 18 the charge or discharge rate for the capacitor can be varied to thereby determine the point or phase angle in the positive half cycle when the SCR will conduct.

By charging the capacitor negative a number of advantages are obtained. For instance, in a circuit designed to control a given amount of power it is possible to use a capacitor with a smaller value of capacitance since the negative charge delays the firing of the SCR more than would be the case were it not charged negatively. Another advantage is that by placing a negative charge on the capacitor a reverse bias is provided on the gate of the SCR which is therefore less apt to turn on as the result of voltage transients as would be the case were it not charged negatively.

There is an additional advantage which can be appreciated from a further inspection of FIG. 2*a*, namely, a change in the gate firing voltage due to temperature change will have an insignificant effect on the conduction angle. As may be seen in FIG. 2*a* at point 27 where the voltage on the capacitor 20 is zero and assuming a condition where because of temperature change the SCR will fire when zero voltage is applied to the gate, the change in conduction angle is very slight. This is illustrated by the slight displacement of the firing point between zero and that otherwise determined by the value 26 as designated by reference numeral 29.

By reference to FIG. 2*b* still another advantage can be seen. This figure illustrates in the curve 28 that the voltage on the capacitor is produced by resistor-capacitor combination having values of R and C respectively so as to provide time constant equal to RC. If the values of resistance and capacitance are changed so the time constant now equals $2_{RC}$ as shown in the dotted line curve 30, the effect on the delay or firing angle is very slight — shifting only by that time indicated by the vertical lines marked by RC and $2_{RC}$. Thus, fine adjustment or trimming is not necessary and randomly selected resistors and capacitors having the rated values desired may be used in the circuit.

FIG. 2c illustrates how the zener characteristics of the SCR gate is effective in the circuit. As may be seen, the capacitor charges negatively until zener voltage of the gate is reached at 32. The capacitor voltage remains at that negative level until the positive half cycle begins and then charges positive to a value sufficient to provide forward gate voltage so as to cause the SCR to conduct. If the capacitor were allowed to charge further in the negative direction, it would have to be rapidly discharged during the brief part of the positive cycle preceding SCR conduction. This aspect of the invention also permits the use of capacitors with low voltage ratings and the adjustable resistor does not require a low resistance value for large conduction angles. The latter is an advantage because if a lower resistance were required for large conduction angles the heat produced would be relatively great.

FIG. 1 illustrates in dotted lines at 22 an alternative location of the switch 10. When the switch is positioned as shown at 22 and the circuit is connected to a source, the firing circuit consisting of adjustable resistor 18 and capacitor 20 is always energized. When it is desired to operate the circuit and the switch 22 is closed, the SCR will not fire until the desired delay point is reached. With the switch as shown at 10, it is possible to have a single large burst of power to the load when the switch is first closed. This happens because when the switch 10 is closed the conductor 6 may be positive and the SCR will fire with a large conduction angle since there is no negative charge to delay the firing of the SCR.

In some cases it may be desirable to operate the gate circuit at less than line voltage. For this and other reasons the circuits of FIGS. 3, 4 and 5 may be used. In these figures, those elements which are identical to elements in the circuit of FIG. 1 have been given the same reference numerals.

In the embodiment of FIG. 3, the variable resistor 18' is connected to a fixed voltage divider consisting of a pair of resistors 34 and 36 connected across the line. Thus, the voltage supplied to the variable resistor 18' is something less than line voltage which may be desirable when using certain kinds of components to prolong component life. For instance, adjustable resistors which use movable wipers may have their life prolonged by reducing the potential on such wiper. The circuit otherwise operates as does that of FIG. 1.

FIG. 4 illustrates a circuit in which the voltage divided includes an adjustable resistor 36' instead of a fixed resistor 36. In the operation of this circuit the resistors 18' and 36' are selected to be of such relative value that to increase the conduction angle the resistance value of 18' is reduced toward zero. When resistance of 18' is reduced to zero a transition point is reached at which the capacitor is charged a maximum negative value but well below the zener voltage of the SCR. To increase the conduction angle further, the resistance of 36' is reduced. This not only reduces the time constant but simultaneously reduces the voltage from divider consisting of resistors 34 and 36'. In practice, the resistors 18' and 36' may be ganged together by a suitable linkage permitting this operation by the use of one knob or other actuator.

An advantage of this circuit is that the time constant can be reduced to a low value, that is, the conduction angle increased without making the resistance of 34 and 36' as low as in the embodiment of FIG. 3. Further, it is possible to operate this circuit without ever reaching the zener value of the SCR which permits the use of a less expensive SCR.

In the embodiment of FIG. 5, the resistor 36″ is shown as being tapped at a varying point but otherwise the circuit is the same as that of FIG. 4.

By way of exemplification where the power supply is 120 volts at 60 Hz and an SCR having a forward blocking voltage of 250 and a gate trigger circuit of 0.7 millamps maximum is used the circuit values shown in the following table have been found desirable:

| | | FIG. 1 | FIG. 3 | FIG. 4 | FIG. 5 |
|---|---|---|---|---|---|
| Resistor 18 or 18′ | OHMS | 160K to 15K | 40 K to 0 | 27K to 0 | 27K to 0 |
| Resistor 34 | OHMS | — | 12K | 27K | 27K |
| Resistor 36, 36′ or 36″ | OHMS | — | 4K | 7K to 500 | 7K to 500 |
| Capacitor 20 | Micro-farads | 0.68 | 1.5 | 2.2 | 2.2 |

Figure 6:
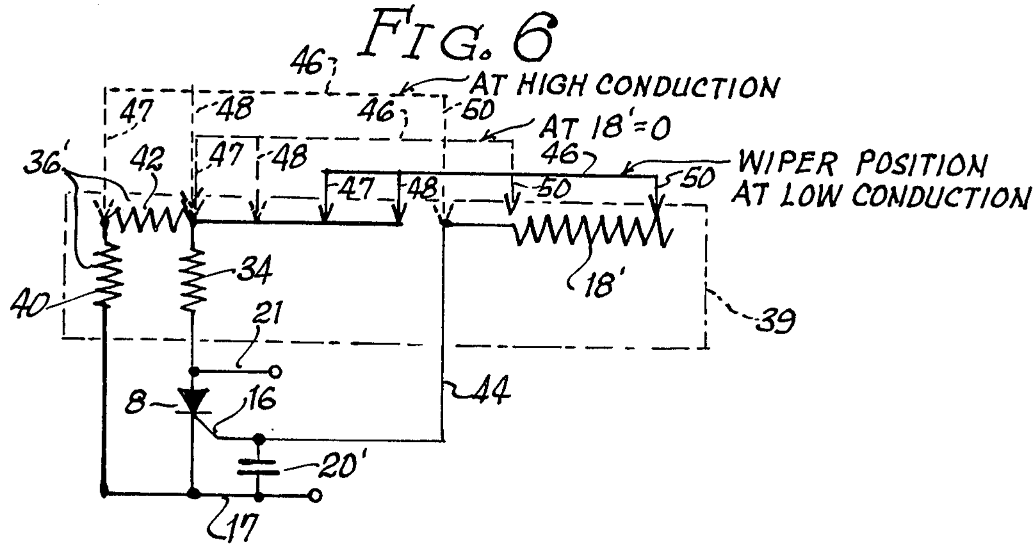
FIG. 6 is an illustration of a physical arrangement of the embodiment of FIG. 4.
Figure 7:
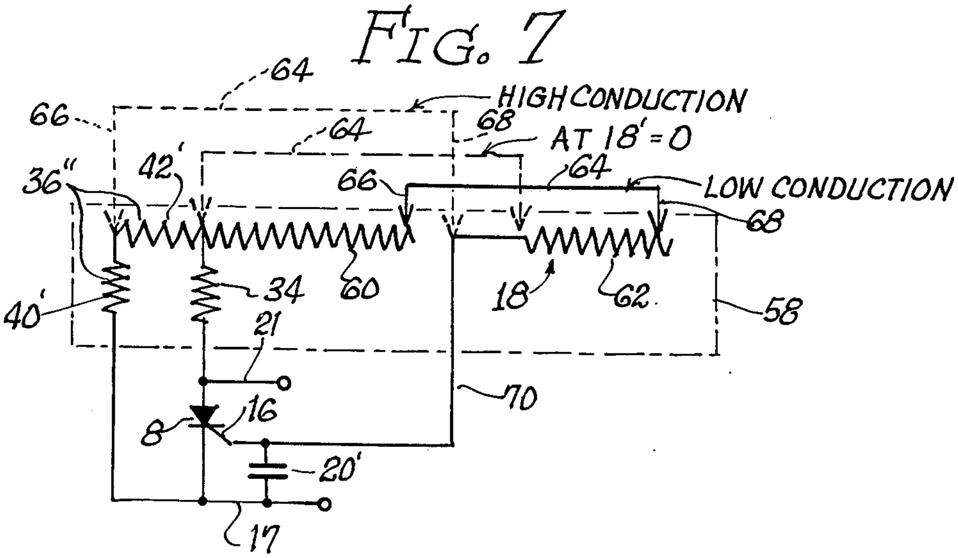
FIG. 7 is an illustration of a physical arrangement of the embodiment of FIG. 5.

FIGS. 6 and 7 illustrate other aspects of the invention. Specifically, they illustrate how the various components may be physically constructed and arranged to achieve the advantages of the invention. In these figures, those parts which are identical to parts shown in previous figures are given the same reference numerals.

FIG. 6 illustrates a physical embodiment of the circuit of FIG. 4. In this embodiment, the resistor elements 18′, 34 and 36′ are printed on an insulating substrate 39 so as to have the physical arrangement illustrated wherein the element 36′ consists of two sections 40 and 42 and the element 18′ is aligned with the section 42. A conductor 44 is connected to one end of the element 18′ and to the junction of the gate 16 and capacitor 20. A sliding contact in the form of a wiper 46 with three contact points 47, 48 and 50 having the relative spacing shown is provided.

The drawing illustrates three possible positions of the wiper 46. In the first of these positions, the one shown at the extreme left-hand side of the drawing in dotted lines and labeled "At High Conduction", the wiper contact point 47 is at the junction of sections 40 and 42 while the wiper contact point 48 is in contact with the other side of section 42. In this position, the section 42 is shunted by the position of the wiper between contact points 47 and 48 so that the resistance value of resistor 36′ is reduced accordingly. At the same time, the contact point 50 has no engagement with any portion of the resistor 18′ so that its resistance value in the circuit has been reduced to zero. However, the contact point 50 is in contact with the conductor 44 so that a connection is established from the junction of the sections 40 and 42 to the conductor 44. When the wiper is so positioned, as stated, the effect is to reduce the resistance value of 18′ to zero and to reduce the resistance value of 36′ by shunting around the section 42 of that resistance. When the wiper is so positioned, therefore, the time constant of the firing circuit is considerably reduced so as to permit the capacitor 20′ to charge faster and thereby increase the conduction angle of the SCR 8.

When it is desired to decrease the conduction angle, the wiper 46 is moved to the right as shown in the drawing at some point assuming the dotted line position indicated by the label "At 18′ = 0". In this position, the contact point 46 is at the junction of the section 42 and the resistor 34. The dimensions are such, however, that the contact point 50 is still not in contact with any portion of the resistor 18′ so that its value is still zero.

However, as may be seen, the resistance section 42 is no longer shunted by the wiper 46 so that it is effectively in the charging circuit for the capacitor 20′, thus increasing the time constant of that circuit and thereby delaying the point at which the SCR 8 conducts.

As the wiper 46 is moved further to the left as shown in the drawing, the contact point 50 begins to have contact with the resistor 18′, thus adding increments of that resistance to the charging circuit. When the wiper reaches the position shown by solid line, all of the resistance 18′ is in the circuit and the conduction angle of the SCR 8 is at its lowest value thus providing for the minimum excitation of the load.

Figure 8:
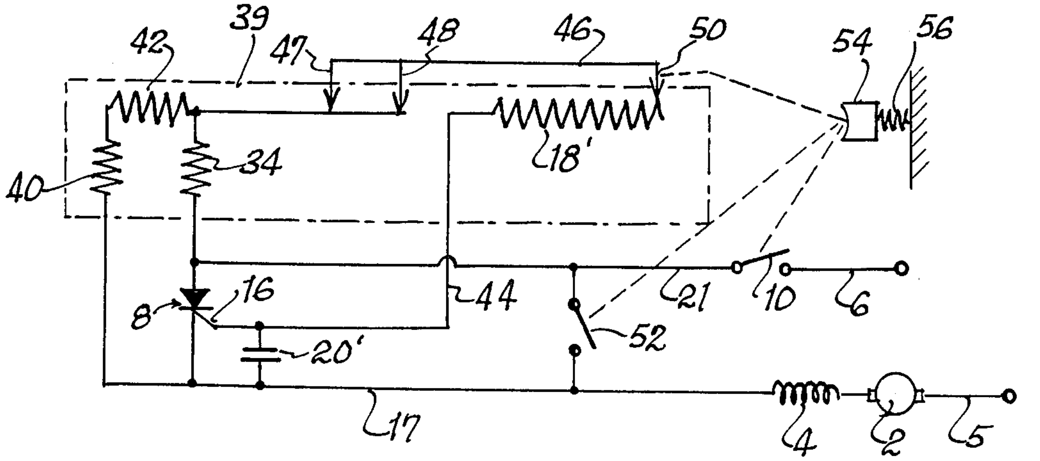
FIG. 8 is an illustration showing how the embodiment of FIG. 6 may be arranged in a power tool so as to effect control by the trigger thereof.

In FIG. 8, the wiper 46, the switch 10 and a shunt switch 52 are mechanically connected to a trigger 54 biased to an outermost position by a spring 56. As the trigger 54 is moved inwardly against the force of the spring 56, the arrangement is such so as to first close the switch 10 thereby connecting the circuit to the line. Further inward movement of the trigger 54 causes the wiper 46 to move to the left as shown in the drawing so as to cause the speed of a motor in a power tool incorporating the invention to progressively increase. At the innermost limit of its movement the wiper 46 has moved to its maximum distance to the left and the switch 52 is closed so as to provide a shunt connection around the SCR 8 so as to permit the motor to operate at full speed. Thus, progressive depression of the trigger 54 is effective to vary the speed of the motor continuously and smoothly over the range from zero to maximum.

In FIG. 7, the embodiment of FIG. 5 is physically constituted by an insulating substrate 58 on which are formed, as before, resistor sections 40′ and 42′ constituting the resistive element 36″, the resistor 34 and a pair of resistor sections 60 and 62 constituting the resistor 18′. In this embodiment, the wiper 64 need be provided with only two contact points 66 and 68.

When the wiper 64 is in the extreme left-hand position indicated by the dotted lines labeled "High Conduction", none of the resistor sections 42′, 60 or 62 are engaged by the contact points 66 and 68 of the wiper 64 so that the wiper is effective to establish a shunt connection from the junction of the resistor sections 40′ and 42′ to the conductor 70 connected to the junction of the capacitor 20′ and gate electrode 16. When in this position, the circuit is such that the capacitor may charge most rapidly to the point sufficient to cause the SCR 8 to conduct. As the wiper is moved to the right, as shown in the drawing, the contact point 66 engages the resistor section 42′ to reduce the conduction angle of the SCR. This continues until a transition point is reached when the wiper is in the position indicated by the dotted line labeled 18′ = 0. Further movement of the wiper 64 to the right brings the contact points 66 and 68 into contact with the resistor sections 60 and 62, thus further retarding the conduction angle of the SCR. This continues until a minimum conduction angle is achieved when the wiper 64 is in the position indicated by solid lines. This embodiment may be mounted in a power tool to be controlled by a trigger in the same fashion as the embodiment illustrated in FIG. 8. When so mounted, the substrate, the wiper, the SCR and capacitor may be disposed in the handle of such a tool.

It is intended by the claims appended hereto to cover all modifications and variations of the invention as come within their scope. What is claimed as new and desired to be secured by Letters Patent is:

1. A power control circuit comprising: a pair of terminals for connection to an alternating current source; a semiconductor controlled conducting device having a high cathode to gate resistance, anode and cathode electrodes and a gate means; means for connecting one of said electrodes to one of said terminals; means for connecting the other of said electrodes to one side of a load; means for connecting the other side of the load to the other of said terminals; a capacitor connected from said gate means to said cathode electrode; a charging circuit for said capacitor comprising a resistive voltage divider connected between said anode and cathode electrodes and an adjustable resistor connected to an intermediate point on said voltage divider; means for adjusting the voltage at the intermediate point on said voltage divider;

said power control circuit including an electrically insulating substrate and wherein said voltage divider and said adjustable resistor are formed in spaced locations on said substrate and further including a movable wiper having first and second contact points spaced from each other a distance sufficient to permit one to engage a portion of either said voltage divider or a portion of said adjustable resistor but insufficient to permit both of said contact points to engage said voltage divider and said adjustable resistor simultaneously so as to permit adjustment of the voltage at the intermediate point of said voltage divider and adjustment of said adjustable resistor.

2. The power control circuit of claim 1 wherein said voltage divider includes two separate resistance sections and said adjustable resistor includes a single resistance section and said wiper includes a third contact point mounted closer to one of said first and second contact points than the other.

3. The power control circuit of claim 1 wherein said voltage divider includes two separate resistance sections and said adjustable resistor includes two separate resistance sections.

4. In a power tool having a driving motor and an actuating element, the improvement comprising a control circuit for said motor including a controllable semiconductor switching device having a control element connected in series with said motor and having means for connections to a power source, a capacitor connected to said control element effective to determine the conduction thereof when charged to a predetermined voltage, a charging circuit for said capacitor including a voltage divider having means for connection to the power source, a resistor connected from said voltage divider to said capacitor, an electrically insulating substrate supporting said voltage divider and said resistor-spaced positions and a movable wiper having first and second spaced contact points engageable with said voltage divider and said adjustable resistor and a mechanical connection to said actuating element so as to be moved in response to movement of said actuating element.

* * * * *